March 24, 1964    A. F. HAYEK    3,126,070
RUBBER STORAGE ENERGY DEVICE
Filed June 26, 1962    3 Sheets-Sheet 1

INVENTOR.
ARTHUR F. HAYEK
BY
*H. S. Mackey*
ATTORNEY

March 24, 1964     A. F. HAYEK     3,126,070
RUBBER STORAGE ENERGY DEVICE

Filed June 26, 1962     3 Sheets-Sheet 2

*INVENTOR.*
ARTHUR F. HAYEK

BY *H. L. Mackey*

ATTORNEY

March 24, 1964  A. F. HAYEK  3,126,070
RUBBER STORAGE ENERGY DEVICE

Filed June 26, 1962  3 Sheets-Sheet 3

INVENTOR.
ARTHUR F. HAYEK
BY H. S. Mackey
ATTORNEY

United States Patent Office 3,126,070
Patented Mar. 24, 1964

3,126,070
RUBBER STORAGE ENERGY DEVICE
Arthur F. Hayek, Pleasantville, N.Y., assignor to General Precision, Inc., a corporation of Delaware
Filed June 26, 1962, Ser. No. 205,257
6 Claims. (Cl. 185—37)

This invention relates to devices for storing energy and particularly to devices utilizing elastic storage members.

Devices for storing energy exist in great variety, and include electrical primary and secondary batteries, inertia devices such as flywheels, pendulumns, and steel or rubber springs. These chemical and mechanical forms of energy storage are used in flashlights, mechanical toys, clocks and in many other devices.

Studies have indicated superiority of rubber over steel for storing mechanical energy because energy storage per unit of material is much greater in some forms of rubber than in steel. In certain applications, economy of weight and volume are of great importance, and the superiority of a rubber spring over a steel spring is clearly evident. As one example, a light-weight radio telephone transmitter-receiver, carried by a man and used while walking, should be as light as possible and should employ a powerful wind-up power source. A silicone rubber spring-operated wind-up motor has several advantages over other sources in addition to its storage capacity: it operates between −50° F. and +400° F., it is unbreakable and can be dropped by parachute, and has indefinitely long life.

Many kinds of resilient materials have similar advantages over steel springs and electrical cells; however, because silicone rubber has a wide useful temperature range, it is preferred over other materials.

The use of a rubber spring in shear has an advantage over use in tension or compression. When a block or other shape of rubber is either pulled in tension or compressed, the total volume must include its space when unstressed plus the space which it occupies after energy has been added by stretching or compressing it. On the other hand, when a rod or tube of rubber is stressed in torsion, the space which the rubber occupies after stressing is approximately the same as the space occupied before stressing. Thus, design compactness is achieved by the use of torsion stressing.

The general purpose of this invention is to provide a windup power source including an energy-storage element employing rubber or a rubber-like resilient material.

A particular purpose of this invention is to provide a rubber or rubber-like energy storage device together with mechanical arrangements for stressing the material in torsion.

Another purpose of this invention is to provide an energy storage device employing rubber or a rubber-like material, a mechanical arrangement for stressing the material in torsion to store mechanical energy therein, and a mechanical arrangement for the orderly discharge and use of the stored energy.

A further understanding of this invention may be secured from the detailed description and associated drawings, in which.

Figure 1:
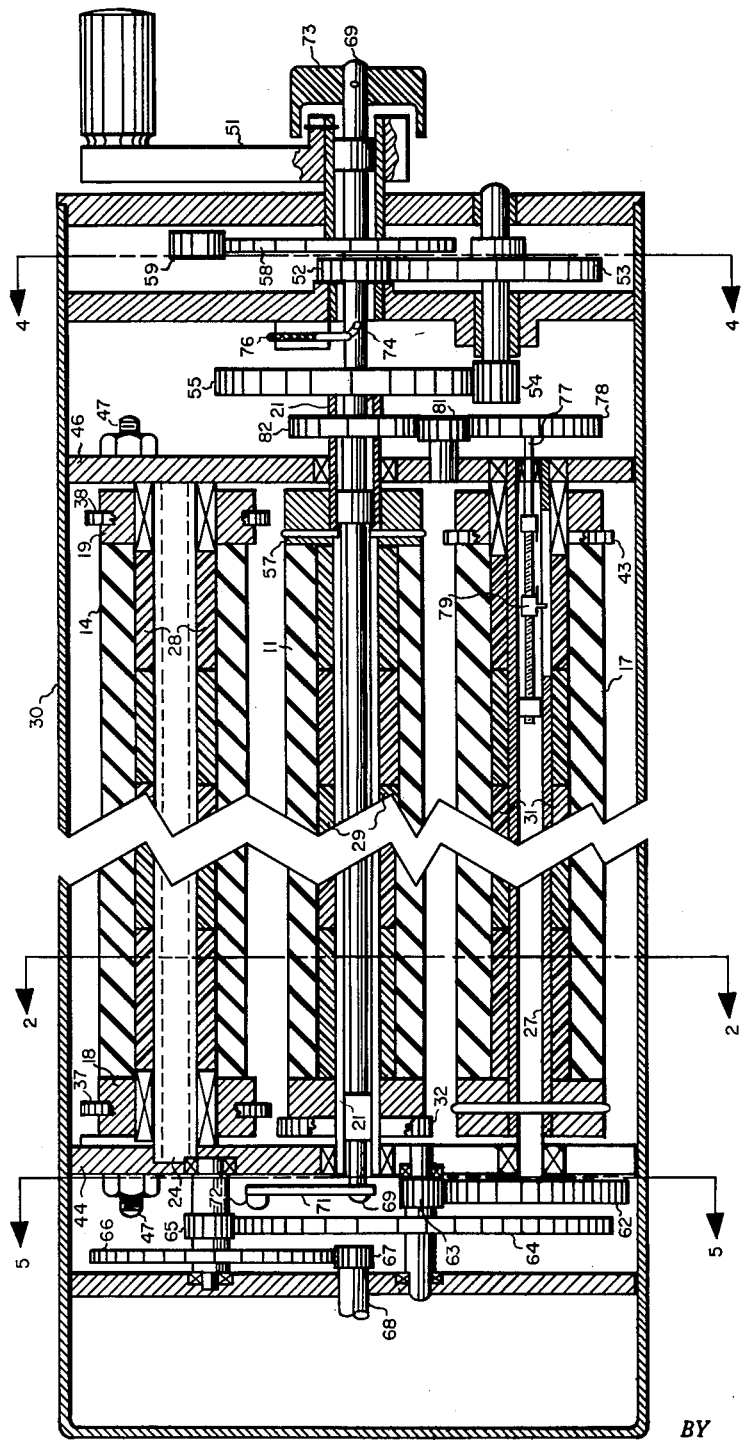
FIG. 1 is a side view of an embodiment of the energy storage device of the invention, sectioned on the line 1—1 of FIG. 2.
Figure 2:
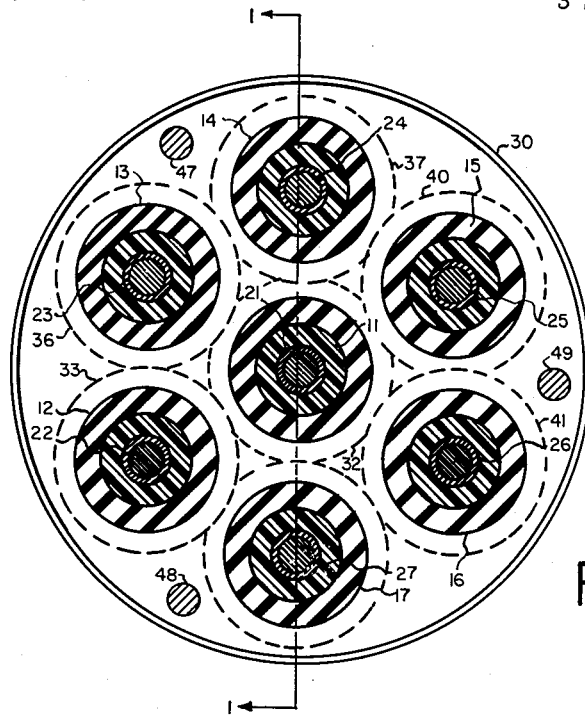
FIG. 2 is a transverse section of the embodiment, taken on the line 2—2 of FIG. 1.

Referring now to FIGS. 1 and 2, seven similar silicone rubber tubes 11, 12, 13, 14, 15, 16 and 17 are provided. Each silicone rubber tube is bonded at each end to a metal cap, such as caps 18 and 19 bonded to tube 14. Each silicone rubber tube is also supported by an axial metal tube, such as tubes 21, 22, 23, 24, 25, 26 and 27 (FIGURE 2). These tube cores are each spaced from their associated silicone rubber tubes by five or six antifriction plastic cylindrical washers, such as the cylinders 28, 29 and 31 of FIGURE 1. Those washers or cylinders may preferably, although not necessarily, be composed of nylon or fluorocarbon resin such as "Teflon." The function of the metal cores and antifriction washers is to prevent the silicone tubes from collapsing or becoming distorted and knotted when wound, and to minimize the friction loss in consequence during the unwinding of the rubber tubes.

Figure 3:
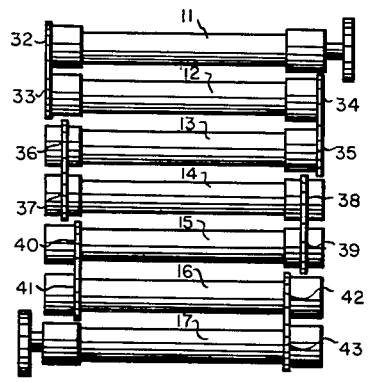
FIG. 3 is a developed view of the seven tubes of FIGS. 1 and 2, showing the tubes laid side by side in a straight row.

The seven silicone tubes are connected in tandem, end to end, by pairs of gears so arranged that torsion applied to one end of tube 11 twists all seven tubes. Upon release of a lock, all of the torsional energy stored in all seven tubes is applied to a load connected to an end of tube 17. This is clearly shown in the developed drawing of FIGURE 3, which shows all seven tubes as if laid side by side in a plane. All of the gear pairs have teeth in the ratio of 1:1. Gears 32 and 33 join tubes 11 and 12; gears 34 and 35 join tubes 12 and 13; gears 36 and 37 join tubes 13 and 14; gears 38 and 39 join tubes 14 and 15; gears 40 and 41 join tubes 15 and 16; and gears 42 and 43 join tubes 16 and 17.

For convenience in assembly in the cylindrical casing 30, the gear pairs are positioned in longitudinal offset relation, successive gear pairs being located at opposite ends of the tubes. The subassembly containing the seven connected tubes is secured to headers 44 and 46, FIGURE 1, by means of three bolts 47, 48 and 49, FIGURES 1 and 2, with the metal tubes 21–27 acting as both supports and spacers for the headers.

Figure 4:
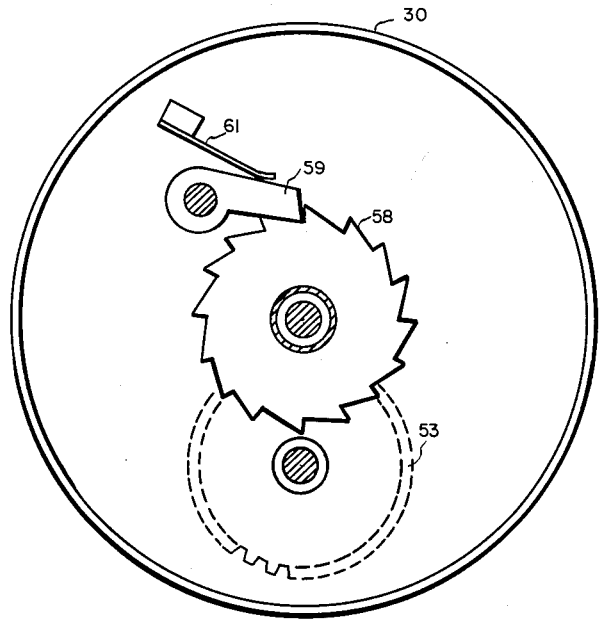
FIG. 4 is a sectional view taken on the line 4—4 of FIG. 1.

Torque is applied to one end of silicone tube 11 by means of a hand crank 51, FIGURE 1, and two gear and pinion pairs 52, 53, 54 and 55. The gear 55 is secured to the tube 21 which is pinned to the end cap 57 of the first silicone tube 11. A toothed ratchet wheel 58, FIGURES 1 and 4, with a pawl 59 and spring 61, prevents reverse motion of the crank 51.

Figure 5:
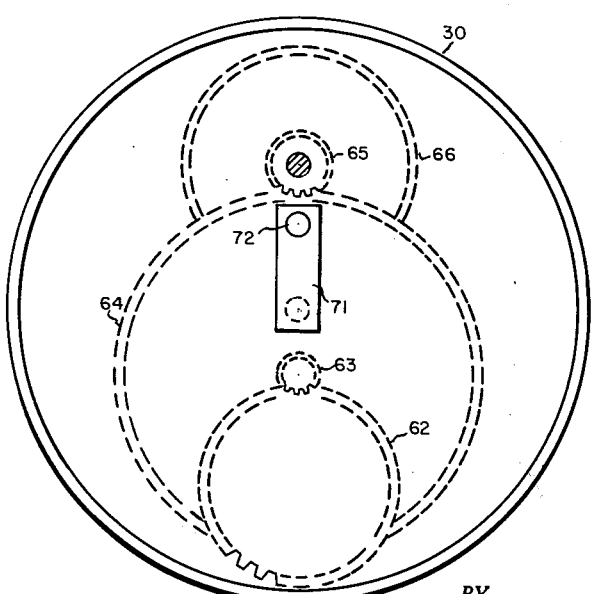
FIG. 5 is a sectional view taken on the line 5—5 of FIG. 1.

The torsion energy output is applied from the silicone tube 17 through three gear and pinion pairs 62, 63, 64, 65, 66 and 67 to an output shaft 68. This shaft is connected to a load, not shown, which may be, for example, a small alternating current generator. This gear train is indicated in FIGURE 5.

A locking mechanism locks the output of the energy storage device until a knob is actuated to apply the energy of the load. This locking mechanism includes a rod 69 running through the center tube 21 which supports the silicone tube 11. This rod 69 is secured at one end to one end of a steel leaf spring 71, FIGURES 1 and 5, carrying on its distal end a rubber pad 72. The rod 69 is secured at its other end to a knob 73. A locking detent is provided which consists of an oblique slot 74 formed in rod 69 together with a spring-loaded pin 76. The oblique slot is spiraled around the shaft 69 so that, when the knob 73 is pulled out, disengaging the rubber pad 72 from the gear 64 and hence releasing the output gear train, the combination of spiral motion and the resiliences of the spring 71 and rubber buffer pad 72 produces a forward impulse to the gear 64. This forward impulse, in the direction of the torque applied by the silicone rubber tubes, tends to overcome static friction or any other static holding force that may be present in the apparatus actuated by the output shaft 68, such as the magnetic attraction between the generator field poles and the armature iron. The slot 74 is made deeper at its two ends to serve as the detent, and detains the rod 69 and knob 73 in either of the two terminal positions. In the terminal position with rod 69 pushed in, the pad 72 presses on the side of gear 64, preventing it and the entire output gear train from turning.

In order to prevent injury to the silicone tubes due to overwinding, a stop is provided comprising a nut and worm contained in the tube 27. The stop includes a screw 77 secured to a spur gear 78 and a nut 79 guided in a slot in the tube 27. The spur gear 78 is geared through an idler 81 to a gear 82 secured to the tube 21. Alternatively, the stop mechanism may be housed outside of tube 27 in a space between the rubber tubes, or elsewhere, permitting use of a larger stop mechanism.

Figure 6:
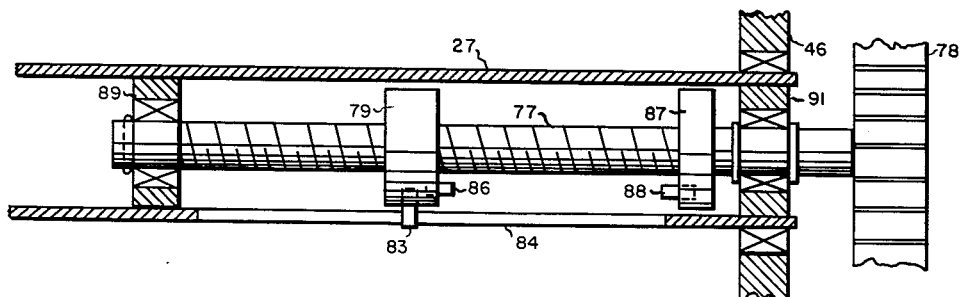
FIG. 6 is a longitudinal section of the stop.

FIGURE 6 illustrates the detailed mechanism of the stop. The nut 79 is provided with a tongue 83 protruding into the slot 84 in the tube 27, preventing the nut from rotating relative to the tube. The nut is also provided with a lug 86 protruding from its face. A collar 87 is pinned to the screw 77 and is provided with a lug 88. Rings 89 and 91 support the screw 77 in tube 27, ring 89 being a loose fit and washer 91 being a press fit.

In operation, when, for example, the worm 77 is turned clockwise by the gear 78, the nut 79 travels to the right until its lug 86 encounters lug 88, locking gear 78 and preventing further rotation thereof and hence further motion of the crank 51, FIGURE 1.

Upon pulling the knob 73 out, the output gear train is released and, driven through tube 27 by the train of rubber tubes as they unwind, drives the output shaft 68. As the output metal tube 27 rotates, it drives the nut 79, FIGURE 6, by means of its slot 84, in a clockwise direction as observed from the position of gear 78. This rotation of the nut 79 in a clockwise direction moves it away from the lug 88 and toward the other end of the screw 77.

What is claimed is:

1. A rubber spring device for storing energy comprising,
   a plurality of cylindrical rubber members,
   means supporting each of said plurality of cylindrical rubber members to maintain the cylindrical shape thereof,
   antifriction means interposed between said last-named means and each of said rubber members,
   means gearing the ends of said rubber members together, said means including a rotatable input and a rotatable output,
   means applying torque to rotate said input thereby tensing said rubber members equally in torsion and storing energy therein equally in the form of shear strain, and
   rotatable means connected to said rotatable output for abstracting said shear strain energy equally from all of said plurality of cylindrical rubber members.

2. A rubber spring device in accordance with claim 1 including,
   brake means associated with said rotatable output for preventing rotation thereof, and
   means actuated by the release of said brake means for imparting a starting impulse to said output.

3. A rubber spring device for storing energy comprising,
   a plurality of identical cylindrical hollow rubber members, each of said hollow members being provided with a pair of end caps, one end cap being secured to each end of the respective member,
   gears positioned on said end caps connecting said plurality of rubber members in a tandem string, the first of said rubber members geared in tandem having a mechanical input terminal at one end thereof, and the last of said rubber members geared in tandem having a mechanical output terminal at one end thereof,
   a non-flexible supporting tube centered in each said rubber member,
   a hollow cylindrical antifriction tube interposed between each non-flexible tube and its surrounding rubber member,
   means for applying a mechanical force to said input terminal stressing the rubber members in torsion to generate shear strain therein, and
   means connected to said output terminal for abstracting energy of said shear strain therefrom.

4. A rubber spring device for storing energy in accordance with claim 3 including a lock on said mechanical output terminal controlling the abstraction of energy from the rubber spring device.

5. A rubber spring device for storing energy in accordance with claim 3 including manually-operated crank means secured to said mechanical input terminal for storing energy equally in said plurality of rubber members, said crank means including a ratchet permitting rotation in one direction only.

6. A rubber spring device for storing energy in accordance with claim 3 including stop means joining said mechanical input terminal to said mechanical output terminal, said stop means preventing overwinding of said mechanical input terminal relative to said mechanical output terminal.

References Cited in the file of this patent

UNITED STATES PATENTS

| 1,076,314 | Pitman | Oct. 21, 1913 |
| 2,305,732 | Piron | Dec. 22, 1942 |
| 2,690,335 | Ballard | Sept. 28, 1954 |
| 2,729,442 | Neidhart | Jan. 3, 1956 |

FOREIGN PATENTS

| 676,098 | Great Britain | July 23, 1952 |
| 748,078 | Great Britain | Apr. 18, 1956 |